US008329348B2

(12) United States Patent
McLean et al.

(10) Patent No.: US 8,329,348 B2
(45) Date of Patent: Dec. 11, 2012

(54) PORTABLE FUEL CELL POWER SOURCE (75) Inventors: Gerard F. McLean, West Vancouver (CA); Joerg Zimmermann, Vancouver (CA); Jeremy Schrooten, Mission (CA)

(73) Assignee: Societe BIC, Clichy (FR)

(*) Notice: Subject to any disclaimer, the term of this patent is extended or adjusted under 35 U.S.C. 154(b) by 0 days.

(21) Appl. No.: 13/367,998

(22) Filed: Feb. 7, 2012

(65) Prior Publication Data
US 2012/0141892 A1 Jun. 7, 2012

Related U.S. Application Data (63) Continuation of application No. 12/025,627, filed on Feb. 4, 2008, now Pat. No. 8,124,288.

(60) Provisional application No. 60/887,955, filed on Feb. 2, 2007.

(51) Int. Cl.
*H01M 8/06* (2006.01)

(52) U.S. Cl. ........ 429/416; 429/408; 429/443; 429/444; 429/513; 429/515

(58) Field of Classification Search .......... 429/408, 429/416, 426, 443, 444, 446, 447, 513, 515
See application file for complete search history.

(56) References Cited

U.S. PATENT DOCUMENTS

| | | | |
|---|---|---|---|
| 5,286,462 A | 2/1994 | Olson | |
| 6,544,400 B2 | 4/2003 | Hockaday et al. | |
| 6,800,258 B2 | 10/2004 | Andersen | |
| 7,378,176 B2 | 5/2008 | McLean et al. | |
| 7,803,349 B1 * | 9/2010 | Muradov | 423/657 |
| 2005/0250004 A1 | 11/2005 | McLean et al. | |
| 2006/0127734 A1 * | 6/2006 | McLean et al. | 429/34 |
| 2007/0090786 A1 | 4/2007 | McLean | |
| 2008/0187798 A1 | 8/2008 | McLean et al. | |

OTHER PUBLICATIONS

"U.S. Appl. No. 12/025,627, Response filed Aug. 3, 2011 to Non Final Office Action mailed Apr. 14, 2011", 11 pgs.
"U.S. Appl. No. 12/025,627, Non Final Office Action mailed Apr. 14, 2011", 15 pgs.
"U.S. Appl. No. 12/025,627, Notice of Allowance mailed Oct. 27, 2011", 9 pgs.
"U.S. Appl. No. 12/025,627, Response filed Feb. 23, 2011 to Restriction Requirement mailed Feb. 1, 2011", 7 pgs.
"U.S. Appl. No. 12/025,627, Restriction Requirement mailed Feb. 1, 2011", 6 pgs. McLean, G. F., "Flexible Fuel Cell", U.S. Appl. No. 60/975,132, filed Sep. 25, 2007, 20 pgs.
Schrooten, J., et al., "Electrochemical Cell and Membranes Related Thereto", U.S. Appl. No. 61/025,739, filed Dec. 1, 2009, 27 pgs.
Schrooten, J., et al., "Electrochemical Cell Assemblies Including a Region of Discontinuity", U.S. Appl. No. 61/021,581, filed Jan. 16, 2008, 32 pgs.
Schrooten, J., et al., "Fuel Cell Systems Including Space-Saving Fluid Plenum and Related Methods", U.S. Appl. No. 12/238,241, filed Sep. 25, 2008, 36 pgs.

* cited by examiner

*Primary Examiner* — Jennifer Michener
*Assistant Examiner* — Heng Chan
(74) *Attorney, Agent, or Firm* — Schwegman Lundberg & Woessner, P.A.

(57) ABSTRACT

Embodiments of the present invention relate to a portable fuel cell power source including an expandable enclosure, a first reactant contained within the enclosure, one or more fuel cells and a fluid port positioned in the expandable enclosure and adapted to be in fluidic communication with the one or more fuel cells. The enclosure may also include an opening to insert a second reactant. When the first reactant is contacted with the second reactant a fuel is generated for use with one or more of the fuel cells. The volume of the portable fuel cell power source in a collapsed state may be smaller than the volume of the amount of first reactant and second reactant needed to substantially consume the first reactant in a fuel generation reaction.

17 Claims, 8 Drawing Sheets

PORTABLE FUEL CELL POWER SOURCE

PRIORITY OF INVENTION

This non-provisional application is a continuation application of U.S. patent application Ser. No. 12/025,627, filed Feb. 4, 2008, which application claims the benefit of priority under 35 U.S.C. §119(e) U.S. Provisional Patent Application Ser. No. 60/887,955, filed Feb. 2, 2007, which applications are incorporated herein by reference in their entirety.

BACKGROUND

In many situations and locations, normal electrical power is unavailable due to a failure of the electrical grid or remoteness of location. Charging rechargeable battery devices or directly powering electrical appliances are significant challenges when normal electrical power, such as AC service, is unavailable. Battery power provides a means of operating away from electrical mains, giving rise to a large number of different battery powered devices. However, common battery formats tend to be optimized for service intervals convenient when grid power is available for recharging or when grid powered infrastructure, such as retail outlets, are available for distribution of new batteries.

In situations where grid powered services are unavailable, then either a large store of replacement batteries must be cached, or some other form of battery recharging is required. Caching of supplementary batteries poses a problem due to both the low energy density of conventional batteries and also because of self-discharge issues, which can limit the life expectancy of the battery cache.

Supplementary non-grid charging systems exist and may be used. Examples include solar powered chargers, hand crank chargers, other forms of kinetic chargers or energy scavenging devices. These all share various deficiencies, such as requiring large formats, dependency on local environmental conditions to generate power and insufficient power generation to operate most devices.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

SUMMARY

Embodiments of the present invention relate to a portable fuel cell power source including an expandable enclosure, a first reactant contained within the enclosure, one or more fuel cells and an optional fluid port positioned in the expandable enclosure and adapted to be in fluidic communication with the one or more fuel cells. The enclosure may also include an opening to insert a second reactant. When the first reactant is contacted with the second reactant a fuel is generated for use with one or more of the fuel cells. The volume of the portable fuel cell power source in a collapsed state may be smaller than the volume of the amount of first reactant and second reactant needed to substantially consume the first reactant in a fuel generation reaction. Embodiments of the present invention also describe methods of generating a fuel for use with one or more fuel cells.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a portable fuel cell power source that allows for a simple, low-cost means of generating a fuel, such as hydrogen, by chemical reaction. The power source has an extended shelf life and provides a high-performance means of generating electrical power. It is suitable for emergency or remote power generation to directly power electrical appliances or to recharge batteries to power such appliances. When in non-use, the power source has a stored volume that is minimal so as to increase the energy density of the power source in its stored state. The minimized volume is due to the power source storing as little as one reactant when in its non-use state. The power source may optionally incorporate a self regulating mechanism to limit the rate at which fuel is produced. By incorporating a flexible reactor, the stored volume of the system is much less than the volume required to generate fuel and power. In non-use or storage state, the portable fuel cell power source is compact, dry and sealable to promote convenient transport, long life and provides uncontaminated fuel cells and reactants when needed for use. In operation, the power source expands physically due to the introduction of at least a second reactant and the generation of a fuel.

Embodiments of the present inventions may utilize an electrochemical cell layer including a plurality of unit cells that may be constructed by providing a substrate including a plurality of ion conducting regions. Such a substrate could be provided, for example by selectively treating a sheet of non- or partially-conducting material to form the ion conducting regions, or by selectively treating a sheet of ion conducting material to form non-conducting regions, as described, for example in the commonly-assigned application Ser. No. 11/047,558, filed 4 May 2004, entitled "MEMBRANES AND ELECTROCHEMICAL CELLS INCORPORATING SUCH MEMBRANES", the disclosure of which is herein incorporated by reference. Unit cells according to the invention may be used in a planar electrochemical cell layer that is conformable to other geometries, as described in application Ser. No. 11/185,755, filed on 21 Jul. 2004, entitled "DEVICES POWERED BY CONFORMABLE FUEL CELLS" and application Ser. No. 60/975,132, filed 25 Sep. 2007, entitled "FLEXIBLE FUEL CELL," which are hereby incorporated by reference.

Arrays of unit cells can be constructed to provide varied-power generating electrochemical cell layers in which the entire electrochemical structure is contained within the layer. This means additional components such as plates for collecting currents etc. can be eliminated, or replaced with structures serving different functions. Structures like those described herein are well adapted to be manufactured by continuous processes. Such structures can be designed in a way which does not require the mechanical assembly of individual parts. In some embodiments, the conductive path lengths within this structure may be kept extremely short so that ohmic losses in the catalyst layer are minimized.

Array may refer to a plurality of individual unit cells. The plurality of cells may be formed on a sheet of ion exchange membrane material, a substrate, or may be formed by assembling a number of components in a particular manner. Arrays can be formed to any suitable geometry. Examples of planar arrays of fuel cells are described in co-owned U.S. application Ser. No. 11/047,560 filed on 2 Feb. 2005 entitled "ELECTROCHEMICAL CELLS HAVING CURRENT CARRYING STRUCTURES UNDERLYING ELECTROCHEMICAL REACTION LAYERS", the disclosure of which is herein incorporated by reference. Fuel cells in an array can also follow other planar surfaces, such as tubes as found in cylindrical fuel cells. Alternately or in addition, the array can include flexible materials that can be conformed to other geometries.

DEFINITIONS

As used herein, "fuel cell" refers to an electrochemical cell in which the energy of a reaction between a fuel and an oxidant is converted into electrical energy. Examples of fuel cells include proton exchange membrane fuel cells (PEM-FCs), solid oxide fuel cells (SOFCs), molten carbonate fuel cell (MCFCs), alkaline fuel cells, direct methanol fuel cells, zinc-air fuel cells or phosphoric acid fuel cells. Examples of fuel cells may be found in commonly-owned U.S. Patent Application "ELECTROCHEMICAL CELL AND MEMBRANES RELATED THERETO", filed Feb. 1, 2008, Ser. No. 61/025,739 and U.S. patent application "FLEXIBLE FUEL CELL STRUCTURES HAVING EXTERNAL SUPPORT", filed Jan. 9, 2006, Ser. No. 11/327,516, and U.S. Patent Application "ELECTROCHEMICAL CELL ASSEMBLIES INCLUDING A REGION OF DISCONTINUITY", filed Jan. 16, 2008, Ser. No. 61/021,581, the disclosures of which are incorporated herein in their entirety. Further examples of fuel cells and fuel cell arrays are shown in the above mentioned references, Ser. Nos. 11/047,558, 11/185,755, 60/975,132 and 11/047,560.

As used herein, "metal hydride particles" or "metal hydrides" refer to metal or metal alloy particles that are capable of forming metal hydrides when contacted with hydrogen. Examples of such metal or metal alloys are $LaNi_5$, FeTi, $Mg_2Ni$ and $ZrV_2$. Such compounds are representative examples of the more general description of metal hydride compounds: AB, $AB_2$, $A_2B$, $AB_5$ and BCC, respectively. When bound with hydrogen, these compounds form metal hydride complexes, such as $MgH_2$, $Mg_2NiH_4$, $FeTiH_2$ and $LaNi_5H_6$, for example. Examples of metals used to form metal hydrides include vanadium, magnesium, lithium, aluminum, calcium, transition metals, lanthanides, and intermetallic compounds and solid solutions thereof.

As used herein, "fluid" refers to a continuous, amorphous substance whose molecules move freely past one another and that has the tendency to assume the shape of its container. A fluid may be a gas, liquefied gas, liquid or liquid under pressure. Examples of fluids include hydrogen, methanol, ethanol, formic acid, butane, liquid borohydride formulations (e.g., borohydride compound and one or more alkali metal hydroxides), etc.

As used herein, "active material particles" refer to material particles capable of storing hydrogen or another fluid or to material particles that may occlude and desorb hydrogen or another fluid, such as metal hydrides, for example. The active material may be a metal, metal alloy or metal compound capable of forming a metal hydride when in contact with hydrogen, For example, the active material may be $LaNi_5$, FeTi, an alloy containing mischmetal, a mixture of metals or an ore, such as $MmNi_5$, wherein Mm refers to a mixture of lanthanides. The active material particles may occlude hydrogen by chemisorption, physisorption or a combination thereof. Active material particles may also include silicas, aluminas, zeolites, graphite, activated carbons, nano-structured carbons, micro-ceramics, nano-ceramics, boron nitride nanotubes, palladium-containing materials or combinations thereof.

As used herein, "chemical hydride" refers to a substance that decomposes to release hydrogen including simple or complex metal hydride compounds that decompose to produce hydrogen. Simple metal hydrides that decompose to provide hydrogen include sodium hydride, lithium hydride, calcium hydride, aluminum hydride, and magnesium hydride. Complex metal hydrides that decompose to provide hydrogen include alkali metal borohydrides, such as magnesium aluminum hydride, sodium borohydride, and lithium aluminum hydride. Some chemical hydrides, such as lithium aluminum hydride, may decompose to release hydrogen via thermolysis reactions, others by hydrolysis. Further examples of chemical hydrides include borazane, ammonium chloride, ammonium fluoride, titanium hydride, iron magnesium hydride, silanes or combinations thereof. Catalysts utilized in a chemical hydride reaction may include ruthenium, cobalt, platinum, palladium alloys thereof, or a combination thereof.

Figure 1A:
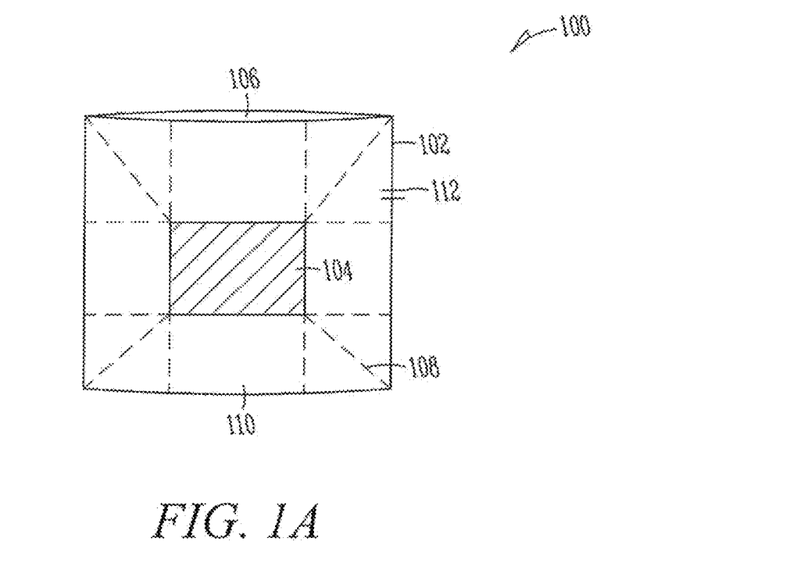
FIG. 1A illustrates a schematic of a portable fuel cell power source 100, according to some embodiments.
Figure 1B:
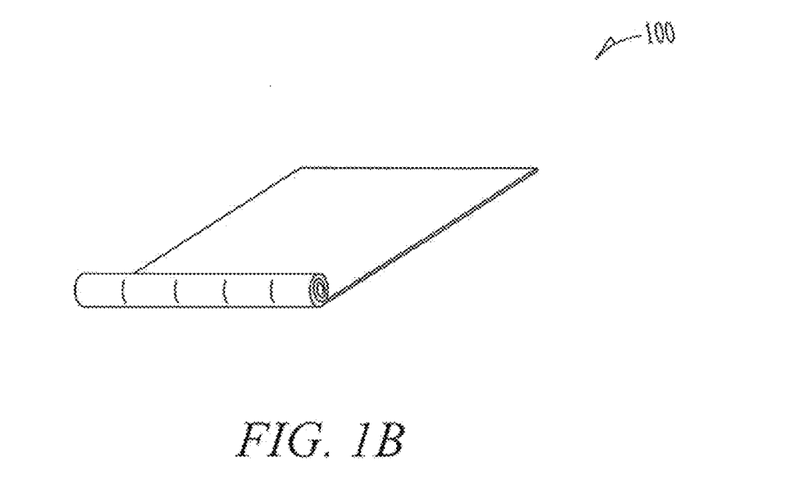
FIG. 1B illustrates a perspective view of a portable fuel cell power source 100, according to some embodiments.

Referring to FIG. 1A, a schematic of a portable fuel cell power source 100 is shown, according to some embodiments. The portable fuel cell power source may include an expandable enclosure 102, such as a bag. A first reactant 104 may be enclosed within the bag. The enclosure 102 may also include a resealable opening 106, to introduce a second reactant. A fluid port 112 may be integrated into one or more of the outer surfaces. Additional chemicals 110, such as catalysts or electrolytes, may be included within the enclosure 102. The expandable enclosure 102 may be folded along lines 108. A perspective view of a portable fuel cell power source 100 is shown in FIG. 1B, in a partially rolled configuration, according to some embodiments.

The expandable enclosure 102 may be a plastic bag, for example. The enclosure 102 may be rigid or flexible, so long as it is capable of expanding to accommodate the volume of fuel generated. When not generating fuel, the enclosure can be collapsed, folded or rolled to a minimal volume for storage or transport, for example. As a second reactant or third reactant may be stored outside of the enclosure until ready for use, the enclosure 102 may be configured to provide a volume only slightly more than the first reactant 102 contained within it. The volume of the enclosure 102 and first reactant 104 may be about 10% more than the volume of the first reactant 104 alone, for example. When collapsed, the expandable enclosure 102 may be sealed from ambient air, such as by vacuum sealing, in order to prevent inadvertent commencement of a fuel generating reaction or degradation of reactants, for example. The enclosure 102 may also be laid flat and most the air trapped in the enclosure forced out before collapsing, such as by folding. Any integrated or attached fuel cells may also be vacuum sealed to prevent electrode degradation during non-use.

The resealable opening 106 may be utilized to add a second reactant or third reactant to the enclosure 102, in order to commence a reaction to generate a fuel, for example. The fluid port 112 may be in fluidic communication with one or more fuel cells, such that the fuel generated may pass through the port 112 to the fuel cell, for example. The fluid port 112 may be a plenum, opening or valve, for example.

Figure 2:
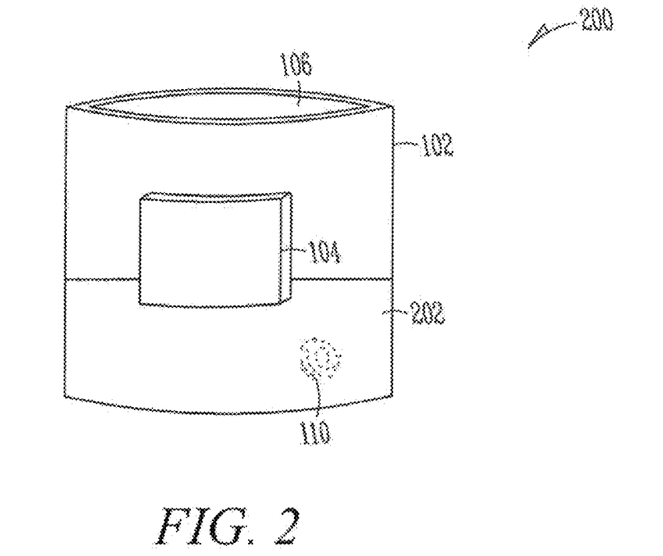
FIG. 2 illustrates a schematic of an unfolded portable fuel cell power source 200, according to some embodiments.

Referring to FIG. 2, a schematic of an unfolded portable fuel cell power source 200 is shown, according to some embodiments. An expandable enclosure 102 includes a first reactant 104 in contact with a second reactant 202. The second reactant 202 may enter the expandable enclosure 102 through the resealable opening 106. In one example, the second reactant 202 may be also contained in the enclosure 102, but separated from the first reactant 104 until the operator contacts them. The reactants may be partitioned from each other and the partition or seal manually broken by the user when ready to use, for example. Further, additional chemicals 110 may also be in contact with the first reactant 104, the second reactant 202, or both.

The first reactant 104 may be a hydrogen storage material, metal hydride, chemical hydride, silicon, metals, such as aluminum, iron, magnesium, zinc, or combinations thereof, for example. Further examples of reactants capable of producing hydrogen when in contact with water are shown in the following list:

| Reaction | Products |
| --- | --- |
| $2Al + 6H_2O + 2KOH$ | $3H_2 + 2KAl(OH)_4$ |
| $NaH + H_2O$ | $H_2 + NaOH$ |
| $CaH_2 + 2H_2O$ | $2H_2 + Ca(OH)_2$ |
| $Si + 2H_2O$ | $2H_2 + SiO_2$ |
| $2NaSi + 5H_2O$ | $Na_2Si_2O_5 + 5H_2$ |
| $MgH_2 + 2H_2O$ | $2H_2 + Mg(OH)_2$ |
| $Mg(AlH_4)_2 + 8H_2O$ | $8H_2 + Mg(OH)_2 + Al(OH)_3$ |
| $LiAlH_4 + 4H_2O$ | $4H_2 + LiOH + Al(OH)_3$ |
| $NaBH_4 + 4H_2O$ | $4H_2 + H_3BO_3 + NaOH$ |
| $LiH + H_2O$ | $H_2 + LiOH$ |
| $Al(BH_4)_3 + 12H_2O$ | $Al(OH)_3 + 3H_3BO_3 + 12H_2$ |
| $HCl + 3H_2O + NaBH_4$ | $NaCl + H_3BO_3 + 4H_2$ |
| $LiBH_4 + 4H_2O$ | $4H_2 + LiOH + H_3BO_3$ |
| $LiAlH_4 + NH_4Cl(aq)$ | $LiCl + AlN + 4H_2$ |
| $Si_2H_6 + 4H_2O$ | $2SiO_2 + 7H_2O$ |

The second reactant 202 may be water or alcohol, for example. Depending on the desired reaction, a third reactant may also be present within the enclosure 102 or added with the second reactant 202, for example. The third reactant may be a dry compound, for example. The third reactant may be acidic or basic, for example. The additional chemicals 110 may be catalysts, for example. The first reactant 104, second reactant 202 or third reactant may be mixtures, solutions or combinations of components, for example.

In some embodiments, the first reactant 104 may store hydrogen in a liquid hydrogen-containing material. For example, hydrogen can be liberated from, silanes or aqueous chemical hydrides, such as aqueous sodium borohydride or potassium borohydride. Silanes, such as disilane or trisilane, are examples of pure liquid fuels that may hydrolyze directly with water producing only hydrogen and silica as products. Silanes may also be utilized in non-liquid form. A silane wafer may be one example.

Figure 3:
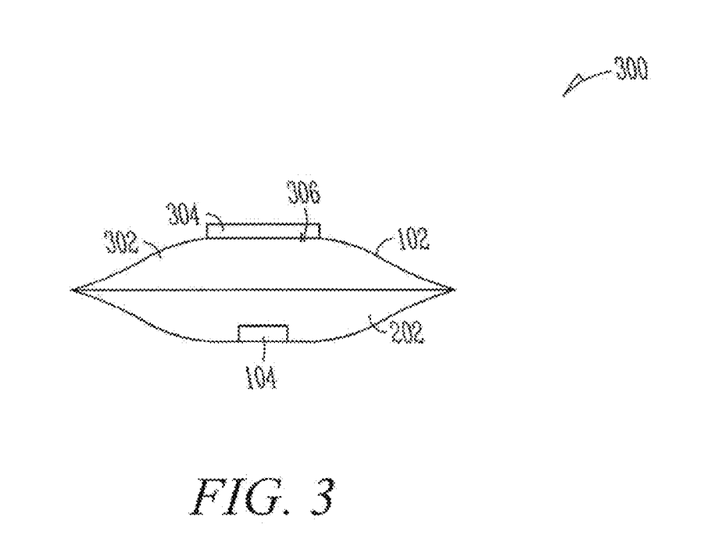
FIG. 3 illustrates a cross-sectional view of a portable fuel cell power source 300, according to some embodiments.

Referring to FIG. 3, a cross-sectional view of a portable fuel cell power source 300 is shown, according to some embodiments. The portable fuel cell power source of 300 may include an expandable enclosure 102 containing a first reactant 104 and second reactant 202 that when in contact with each other, generates a fuel 302, such as hydrogen. The fuel 302 may pass through a fluid port 306, such as a gaseous interconnection, to contact one or more fuel cells 304. The fuel cell 304 may be a single cell, planar layer or stack assembly, for example. The fuel cell 304 may be substantially external to the expandable enclosure 102.

Examples of reactions to generate a fuel 302, such as hydrogen, are described above, but include reacting aluminum with sodium hydroxide and water to produce hydrogen as fuel product. Hydrolysis of chemical hydrides, such as sodium borohydride, may also generate the required fuel, for example. Corrosion of metals, such as iron, aluminum or magnesium, may be another example. Combinations of metals, such as galvanic pairs, may be used to generate a fuel 302. The metals may combine to form a redox pair in the presence of an electrolyte that facilitates the corrosion of at least one of the metals to produce hydrogen. An example would be the combination of magnesium and aluminum in electrical contact with sodium chloride as the electrolyte. When water is added to the system, one or both of the metals will corrode to produce hydrogen.

Mixtures of chemical hydrides and metals may combine to provide a sustained hydrogen-generating reaction. Some chemical hydride reactions are self-limiting, in that the reaction product inhibits the release of hydrogen. By combing the chemical hydride with a corrosion metal, the metal would consume the reaction product to produce additional hydrogen and facilitate the release of hydrogen from the chemical hydride. An example of this would be the combination of sodium borohydride and aluminum in water. Sodium borohydride would normally reach an equilibrium in water in which the sodium hydroxide product inhibits the reaction. The addition of aluminum would consume the sodium hydroxide to produce additional hydrogen and prevent the establishment of an equilibrium. The overall reaction would be:

$$2NaBH_4 + 2Al + 14H_2O \rightarrow 2NaAl(OH)_4 + 2H_3BO_3 + 11H_2$$

If an overpressure of fuel, such as hydrogen, is produced due to a lack of consumption by the associated fuel cells, the enclosure 102 may rupture or the resealable opening 106 may open to create a safe failure of the system. Optionally, a vent or venting mechanism may be integrated to release any excess of fuel produced.

Figure 4A:
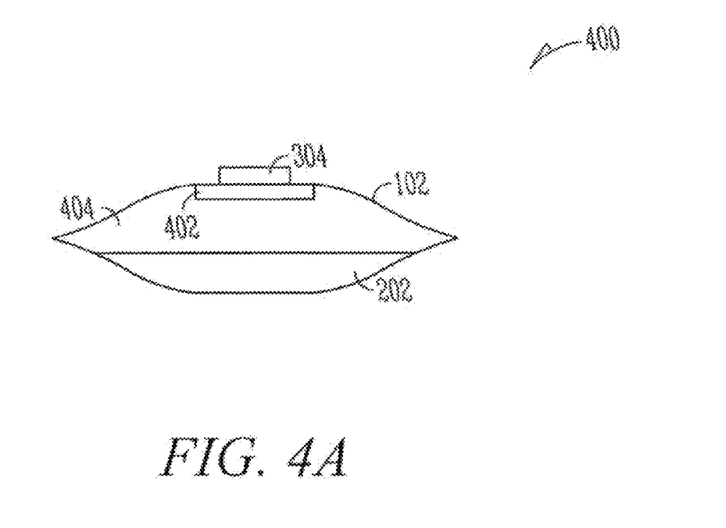
FIG. 4A illustrates a cross-sectional view of a portable fuel cell power source 400 with first reactant in contact with an interior surface, according to some embodiments.
Figure 4B:
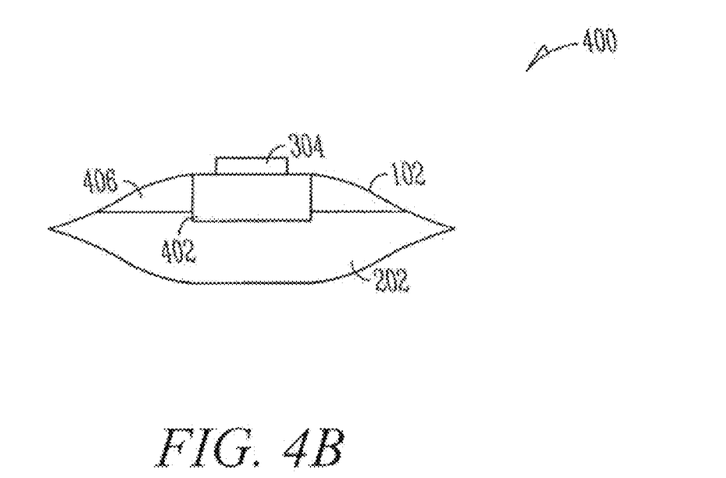
FIG. 4B illustrates a cross-sectional view of a portable fuel cell power source 400 with first reactant in contact with an interior surface and in contact with a second reactant, according to some embodiments.

Referring to FIG. 4A, a cross-sectional view of a portable fuel cell power source 400 is shown with first reactant in contact with an interior surface, according to some embodiments. A first reactant 402 may be attached to an interior wall of the expandable enclosure 102 of the portable fuel cell power source 400. As the fuel 404, such as hydrogen, is generated by the reaction of first reactant 402 and second reactant 202 and not utilized by the associated fuel cells, sufficient pressure is generated to separate the first reactant 402 attached to the interior wall from the second reactant 202. As hydrogen is generated and communicated to the optional fuel cell 304, the pressure reduces. As the pressure drops, the first reactant 402 may come in contact with second reactant 202 to recommence the reaction, as shown in FIG. 4B. This configuration can act as a self regulation mechanism for the generation of a fuel to one or more fuel cells. Another example of self regulating mechanism may be manually positioning the enclosure 102 to separate the reactants, such as by turning, the enclosure 102 upside down or turning it over. The reaction would then recommence by reversing the action.

Figure 5A:
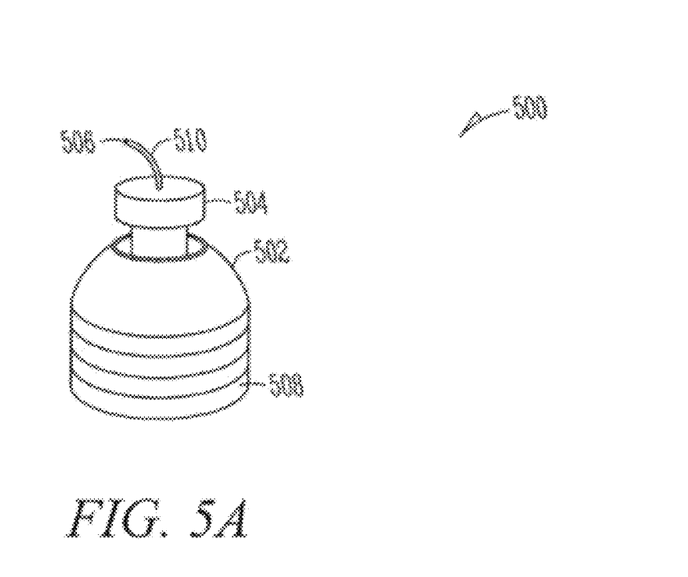
FIG. 5A illustrates a perspective view of a portable fuel cell power source 500 in a collapsed configuration, according to some embodiments.
Figure 5B:
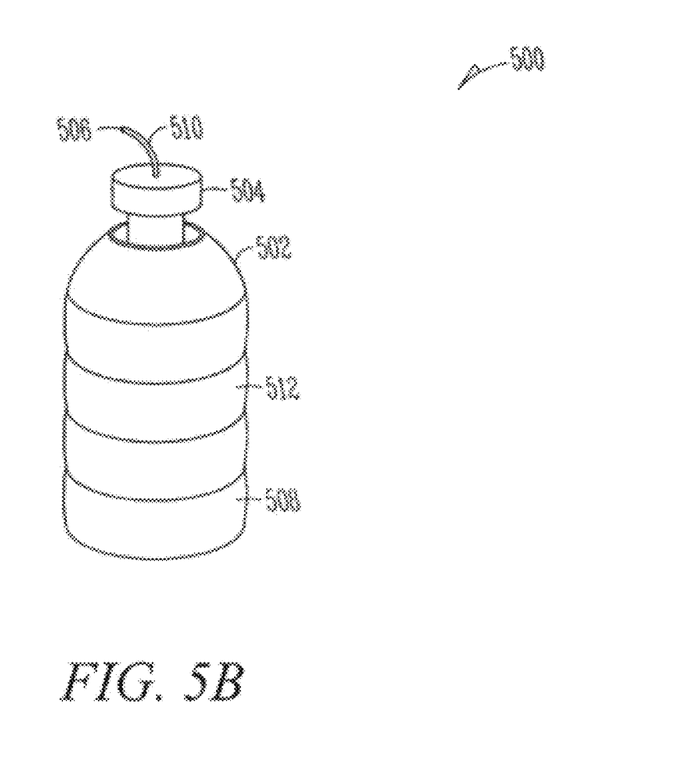
FIG. 5B illustrates a perspective view of a portable fuel cell power source 500 in an expanded configuration, according to some embodiments.

Referring to FIG. 5A, a perspective view of a portable fuel cell power source 500 in a collapsed configuration is shown, according to some embodiments. The portable fuel cell power source 500 may be manufactured of a rigid material and yet still be collapsible to a small volume when fuel is not being generated. A first reactant 508 may be stored within the enclosure 502. A second reactant 512 (as shown in FIG. 5B), may be added through the removable cap 504, to generate a fuel. As the fuel is generated, it may leave the enclosure through flow restricting tube 510 and pass 506 to one or more fuel cells in fluidic communication. As the fuel is generated, the enclosure 502 expands (as shown in FIG. 5B). The first reactant 508 may be stored as a dry component and the second reactant 512 may be added through the removable cap 504, possibly in a liquid state, to generate a fuel, such as hydrogen. A rigid-type enclosure 502 may be able to withstand higher pressures than more flexible, thinner-walled enclosures, for example.

Figure 6A:
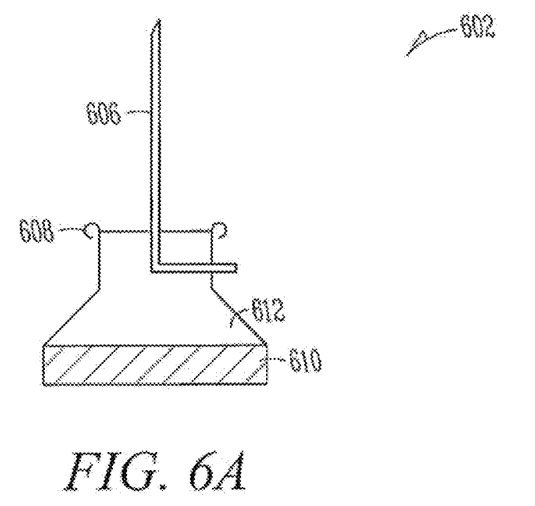
FIG. 6A illustrates a cross-sectional view of a base 602 of a portable fuel cell power source, according to some embodiments.
Figure 6B:
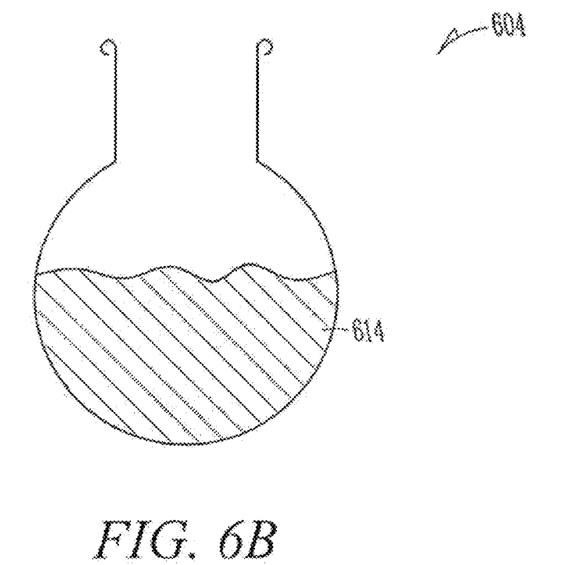
FIG. 6B illustrates a cross-sectional view of a balloon reservoir 604 of a portable fuel cell power source, according to some embodiments.
Figure 6C:
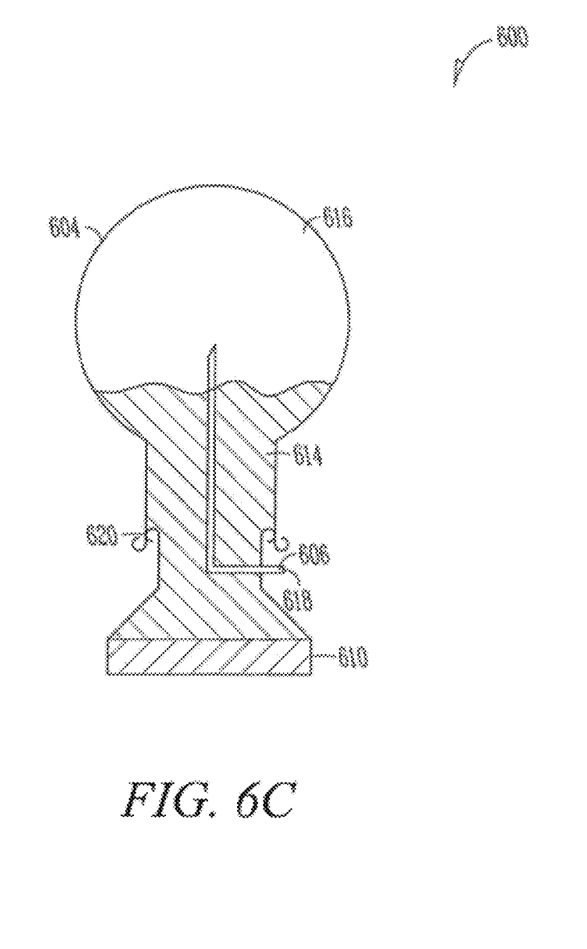
FIG. 6C illustrates a cross-sectional view of portable fuel cell power source 600 utilizing a balloon reservoir, according to some embodiments.

Referring to FIG. 6A, a cross-sectional view of a base 602 of a portable fuel cell power source is shown, according to some embodiments. A portable fuel cell power source 600 may utilize a balloon reservoir 604 attached to a base 602. The base 602 may include an enclosure 612 containing a first reactant 610. The base 602 may include a fuel vent 606 and attachment mechanisms 608. A balloon reservoir 604 (FIG. 6B) may contain a second reactant 614 and be attached to the base 602 via the attachment mechanisms 608, to form the portable fuel cell power source 600 (as shown in FIG. 6C). As the first reactant 610 contacts the second reactant 614, a fuel may be generated 616. The fuel vent 606 allows the fuel 616 to be communicated 618 to one or more fuel cells. In this embodiment, the production of fuel, such as hydrogen, is not self regulating, but the volume of the balloon is variable, expanding to accommodate the excess fuel in order to deliver a constant supply of fuel to an external fuel cell. Once the balloon is filled with fuel and the reactants have been consumed, the balloon storage can be removed from the base and transported if necessary.

Figure 7:
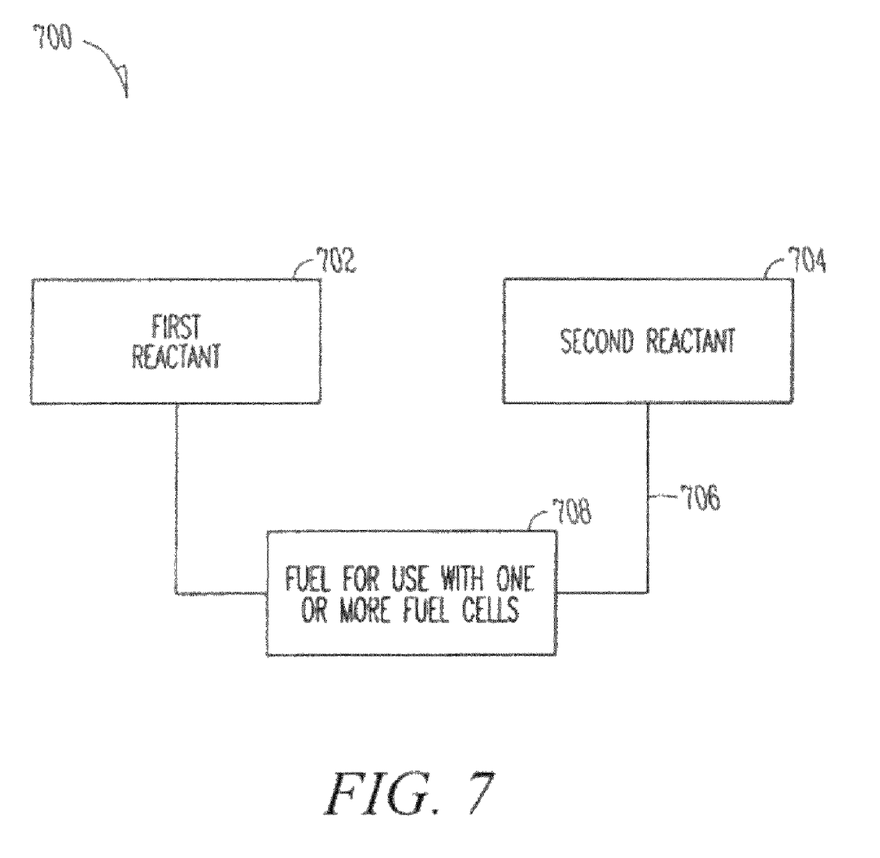
FIG. 7 illustrates a block flow diagram of a method 700 of generating a fuel for use with one or more fuel cells, according to some embodiments.

Referring to FIG. 7, a block flow diagram of a method 700 of generating a fuel for use with one or more fuel cells is shown, according to some embodiments. A first reactant 702 and second reactant 704 may be contacted 706 within an expandable enclosure to generate 708 a fuel for use with one or more fuel cells. Contacting 706 may include mixing, shaking, or exposing, for example. Prior to contacting 706, the enclosure may be vacuum sealed, for example. After contacting 706, the first reactant 702 and second reactant 704 may be separated, sufficient to slow or cease the fuel generating reaction. The reactants may be contacted again to recommence the reaction.

Figure 8:
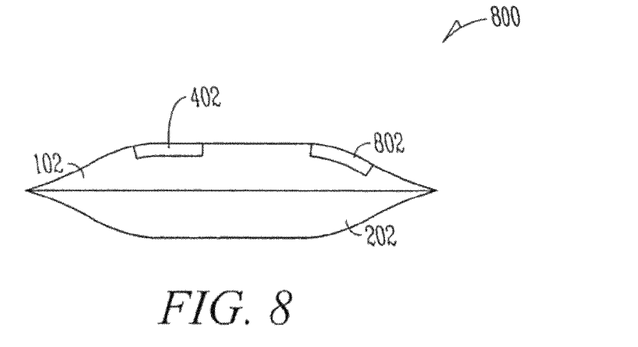
FIG. 8 illustrates a cross-sectional view of a portable fuel cell power source 800 with one or more fuel cells integrated, according to some embodiments.

Referring to FIG. 8, a cross-sectional view of a portable fuel cell power source 800 with one or more fuel cells integrated is shown, according to some embodiments. A first reactant 402 may be attached to an interior wall of the expandable enclosure 102 of the portable fuel cell power source 800. Similar to FIGS. 4A-4B, a second reactant 202 may be added to the expandable enclosure 102 and the fuel generation reaction may be internally regulated.

One or more fuel cells 802 may be attached to the interior of the expandable enclosure 102 or integrally disposed within a wall of the expandable enclosure 102. The fuel cell 802 may be flexible and not require flow distribution manifold for the fuel cell anode, for example. The fuel cell 802 may be an air breathing planar fuel cell layer and the expandable enclosure wall may act as the dielectric substrate around which the fuel cell 802 is built. The expandable enclosure 102 may then act as the fuel distribution plenum and a separate fuel outlet port may be unnecessary, thus simplifying water management within the device and overall control of humidification.

Figure 9A:
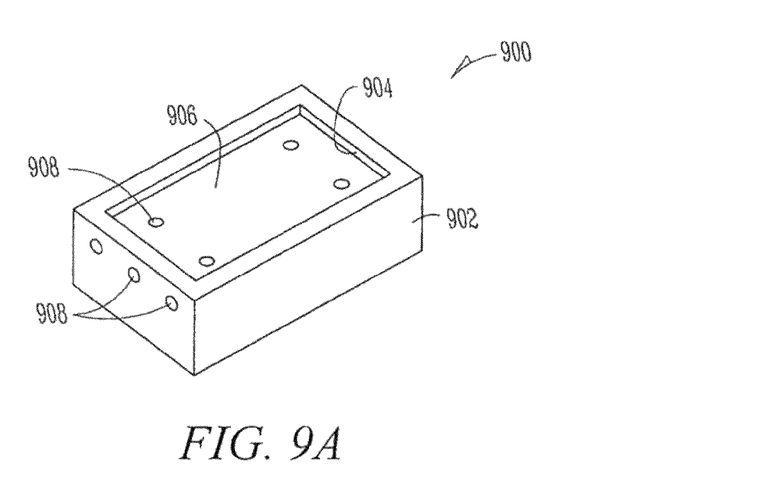
FIG. 9A illustrates a perspective view of a fuel cell integrated with a first reactant 900, according to some embodiments.
Figure 9B:
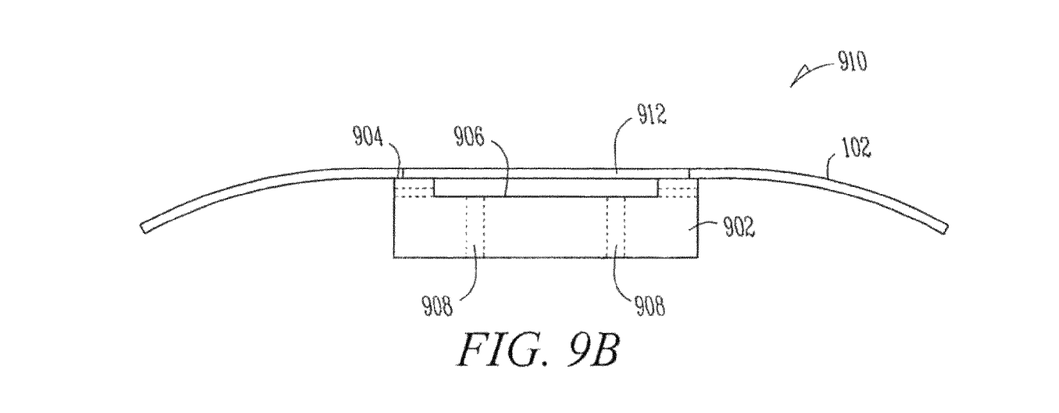
FIG. 9B illustrates a cross-sectional view of a fuel cell integrated with a first reactant, according to some embodiments.

Referring to FIGS. 9A-9B, a perspective and cross-sectional view of a fuel cell integrated with a first reactant 900, 910 are shown, according to some embodiments. One or more fuel cells 912 may be integrated with the first reactant 902, for example. The first reactant 902 may provide a solid base to support the fuel cell 912. Ports 908 may be built into the first reactant 902 which allow for passage of fuel from within the enclosure 102 to the fuel cell 912, for example. More specifically, the ports or inlets 908 may allow for the passage of fuel, such as hydrogen, produced by the fuel generation reaction within the expandable enclosure 102 to the anodes of the one or more fuel cells 912, for example. The first reactant 902 may support a plenum 906 and adjacent ledge 904 that allow for one or more fuel cells 912 to be positioned above the plenum 906. The entire fuel cell/first reactant structure may be mounted or attached to the interior wall of the expandable enclosure 102, for example.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A method of operating a fuel cell power source comprising:
   providing a fuel cell power source that includes an expandable and collapsible enclosure with a resealable opening and a fuel cell layer, wherein the fuel cell layer includes one or more unit fuel cells adjacently arranged;
   storing a first reactant within the enclosure;
   directing a second reactant through the resealable opening;
   contacting the first reactant with the second reactant to generate a fuel;
   contacting the fuel with the fuel cell layer;
   wherein the volume of the enclosure in a collapsed state is smaller than the sum of the volume of the first reactant stored within the enclosure and the volume of an amount of the second reactant needed to substantially consume the first reactant stored within the enclosure.

2. The method of claim 1, wherein the enclosure includes flexible walls and the fuel cell layer is integrated into or attached to the flexible walls.

3. The method of claim 2, wherein the enclosure is a bag.

4. The method of claim 1, wherein the enclosure can be rolled up when in a collapsed configuration.

5. The method of claim 1, further including venting excess fuel from the enclosure.

6. The method of claim 1, wherein the fuel is hydrogen.

7. The method of claim 1, further including contacting additional chemicals with the first and second reactants.

8. The method of claim 7, wherein the additional chemicals are stored within the enclosure with the first reactant.

9. The method of claim 1, wherein the first reactant is attached to at least one interior wall of the enclosure.

10. The method of claim 1, further including interrupting the contact of the first reactant and the second reactant within the enclosure sufficient to reduce the amount of fuel generated and to collapse the enclosure.

11. The method of claim 10, wherein a pressure increase within the enclosure causes the interruption in contact between the first and second reactants.

12. The method of claim 10, interrupting the contact between the first and second reactants includes turning over the enclosure.

13. A method of operating a fuel cell power source comprising:
    providing a fuel cell power source that includes an expandable and collapsible enclosure and a fuel cell layer integrated into or attached to the enclosure, wherein the fuel cell layer includes one or more unit fuel cells adjacently arranged;
    storing a first reactant within the enclosure and a second reactant outside of the enclosure;
    contacting the first reactant and the second reactant to generate hydrogen within the enclosure;
    contacting the hydrogen with the fuel cell layer;
    wherein the portable fuel cell power source is configured to be collapsed to a substantially flat plane and
    wherein the volume of the enclosure in a collapsed state is smaller than the sum of the volume of the first reactant stored within the enclosure and the volume of an amount of the second reactant needed to substantially consume the first reactant stored within the enclosure.

14. The method of claim 13, wherein the enclosure includes flexible walls and the fuel cell layer is integrated into the flexible walls.

15. The method of claim 14, wherein the enclosure can be rolled up when in a collapsed configuration.

16. The method of claim 13, further including venting excess fuel from the enclosure.

17. The method of claim 13, wherein the first reactant is attached to at least one interior wall of the enclosure.

* * * * *

UNITED STATES PATENT AND TRADEMARK OFFICE
CERTIFICATE OF CORRECTION

| | |
|---|---|
| PATENT NO. | : 8,329,348 B2 |
| APPLICATION NO. | : 13/367998 |
| DATED | : December 11, 2012 |
| INVENTOR(S) | : McLean et al. |

It is certified that error appears in the above-identified patent and that said Letters Patent is hereby corrected as shown below:

On the title page, in column 2, under "Other Publications", line 10, after "6 pgs", insert --¶--, therefor In the Specifications:

In column 1, line 8, before "U.S.", insert --to--, therefor

In column 4, line 16, delete "cell" and insert --cells--, therefor

In column 4, line 18-21, delete "U.S. Patent Application "ELECTROCHEMICAL CELL AND MEMBRANES RELATED THERETO" filed Feb. 1, 2008 Ser. No. 61/025,739" and insert --U.S. Patent Application Ser. No. 61/025,739, filed Feb. 1, 2008, entitled "ELECTROCHEMICAL CELL AND MEMBRANES RELATED THERETO",--, therefor In column 4, line 23-26, delete "U.S. Patent Application "ELECTROCHEMICAL CELL ASSEMBLIES INCLUDING A REGION OF DISCONTINUITY" filed Jan. 16, 2008, Ser. No. 61/021,581" and insert --U.S. Patent Application Ser. No. 61/021,581, filed Jan. 16, 2008, entitled "ELECTROCHEMICAL CELL ASSEM-BLIES INCLUDING A REGION OF DISCONTINUITY",--, therefor In column 4, line 29, delete "Nos." and insert -- Nos.:--, therefor In column 4, line 58, delete "hydrogen," and insert --hydrogen.--, therefor In column 7, line 8, delete "combing" and insert --combining--, therefor In column 7, line 37, delete "wail" and insert --wall--, therefor In column 7, line 46, after "turning", delete ",", therefor Signed and Sealed this
Seventh Day of May, 2013

Teresa Stanek Rea
*Acting Director of the United States Patent and Trademark Office*

CERTIFICATE OF CORRECTION (continued)
U.S. Pat. No. 8,329,348 B2

In column 8, line 40, delete "wail" and insert --wall--, therefor

In the Claims:

In column 9, line 15, in claim 1, after "layer;", insert --wherein the portable fuel cell power source is configured to be collapsed to a substantially flat plane and--, therefor In column 10, line 22, in claim 13, after "plane", insert --;--, therefor